United States Patent
Williams et al.

(10) Patent No.: US 11,966,386 B1
(45) Date of Patent: Apr. 23, 2024

(54) METHOD, APPARATUS, AND COMPUTER PROGRAM PRODUCT FOR UTILIZING ACCUMULATION RECORDS TO REDUCE NETWORK TRANSACTIONS

(71) Applicant: McKesson Corporation, Irving, TX (US)

(72) Inventors: Tate Williams, Loganville, GA (US); Karen Padgett, Laveen, AZ (US)

(73) Assignee: MCKESSON CORPORATION, Irving, TX (US)

( * ) Notice: Subject to any disclaimer, the term of this patent is extended or adjusted under 35 U.S.C. 154(b) by 93 days.

(21) Appl. No.: 17/708,432

(22) Filed: Mar. 30, 2022

(51) Int. Cl.
| G06F 16/00 | (2019.01) |
| G06F 16/23 | (2019.01) |
| G06F 40/205 | (2020.01) |
| G06Q 10/00 | (2023.01) |
| G06Q 10/10 | (2023.01) |
| G06Q 30/00 | (2023.01) |
| G06Q 30/0201 | (2023.01) |
| G06Q 30/06 | (2023.01) |

(52) U.S. Cl.
CPC ...... *G06F 16/2379* (2019.01); *G06F 16/2358* (2019.01); *G06F 40/205* (2020.01); *G06Q 10/10* (2013.01); *G06Q 30/0201* (2013.01); *G06Q 30/0206* (2013.01); *G06Q 30/06* (2013.01)

(58) Field of Classification Search
CPC .............. G06F 16/2379; G06F 16/2358; G06F 40/205; G16H 40/20; G16H 40/00; G16H 20/10; G06Q 30/0201; G06Q 30/0206; G06Q 30/06; G06Q 30/02; G06Q 10/10
See application file for complete search history.

(56) References Cited

U.S. PATENT DOCUMENTS

| 5,845,255 A | * | 12/1998 | Mayaud | ................ G16Z 99/00 705/3 |
| 7,912,741 B1 | * | 3/2011 | Pinsonneault | ......... G06Q 40/08 600/300 |

(Continued)

FOREIGN PATENT DOCUMENTS

| CA | 3055579 A1 | * | 3/2021 | |
| WO | WO 03063056 A2 | * | 7/2003 | |

(Continued)

OTHER PUBLICATIONS

George Mastorakos et al., "Probing Patient Messages Enhanced by Natural LanguageProcessing: A Top-Down Message Corpus Analysis", Health Data ScienceVolume 2021, Article ID 1504854, 10 pages,.*

Primary Examiner — Srirama Channavajjala
(74) Attorney, Agent, or Firm — ALSTON & BIRD LLP

(57) ABSTRACT

A method, apparatus and computer program product are provided for utilizing accumulation records to reduce a number of transactions occurring in a network. Aggregated quantities are calculated from at least a first quantity from a first sub-system and a second quantity from the second sub-system. Preliminary amounts may be reduced based on cap amounts less the aggregated quantity, and transmission of messages to certain sub-systems may be precluded. Accumulation records may be maintained by a service provider computer on an ongoing basis. The service provider computer forwards responses that reflect a reduced preliminary amount to a requesting computer that initiated a response.

12 Claims, 2 Drawing Sheets

(56) References Cited

U.S. PATENT DOCUMENTS

| | | | | |
|---|---|---|---|---|
| 8,635,083 | B1* | 1/2014 | Casu | G06Q 30/06 |
| | | | | 705/2 |
| 11,075,010 | B1* | 7/2021 | Goswami | G16H 10/60 |
| 2003/0050799 | A1* | 3/2003 | Jay | G16H 20/10 |
| | | | | 705/14.66 |
| 2005/0065821 | A1* | 3/2005 | Kalies | G06Q 30/02 |
| | | | | 705/2 |
| 2007/0276697 | A1* | 11/2007 | Wiley | G06Q 30/0207 |
| | | | | 705/2 |
| 2008/0235050 | A1* | 9/2008 | Hallberg | G06Q 30/06 |
| | | | | 705/28 |
| 2013/0151373 | A1* | 6/2013 | Flanagan | G06Q 30/018 |
| | | | | 705/26.25 |
| 2019/0385722 | A1* | 12/2019 | Wiley, II | G16H 40/20 |
| 2020/0066392 | A1* | 2/2020 | Bess | G16H 50/70 |
| 2021/0158413 | A1* | 5/2021 | Kello | G06Q 20/405 |

FOREIGN PATENT DOCUMENTS

| | | | |
|---|---|---|---|
| WO | WO 2015148047 | A1 * | 10/2015 |
| WO | WO 2021014387 | A1 * | 1/2021 |

\* cited by examiner

METHOD, APPARATUS, AND COMPUTER PROGRAM PRODUCT FOR UTILIZING ACCUMULATION RECORDS TO REDUCE NETWORK TRANSACTIONS

TECHNOLOGICAL FIELD

Embodiments of the present invention relate generally to electronic messages and network transactions, and more particularly, to methods, apparatuses, and computer program products for utilizing accumulation records to reduce network transactions.

BACKGROUND

Numerous electronic messages and network transactions are transmitted within a network and are further processed and routed by a service provider computer. The service provider computer may assist with certain processing tasks, and route the messages to other sub-systems, monitor for responses, optionally edit certain messages or transactions, and forward or route response messages to the message originator or requestor. In certain examples, as the service provider computer evolves to provide additional functionality, integration between the service provider computer and other services may impact communication between the service provider computer and its other sub-systems. Particularly, two or more distinct sub-systems developed independently of each other, but having similar or overlapping functionality may pose problems when both or all are integrated with the service provider computer.

In the area of prescription drug pricing, many systems, methods, and algorithms are utilized for pricing prescription drugs. Some manufacturers offer rebates that are credited toward certain prescription transactions, that are often payable to the pharmacy, but that alleviate some of the out of pocket expense for a patient. The manufacturer-paid rebates may encourage patient adherence to certain medications or brands.

In some instances, a service provider computer is employed to determine how to distribute the rebates amongst numerous prescription transactions occurring in the network. Recent improvements to the service provider computer include calculating a rebate on a per-transaction basis and in real-time or near real-time relative to initiation of a prescription transaction at a pharmacy computer. Various algorithms and methodologies may be utilized, including those that variably weight certain factors such as demographics of the patient and/or pharmacy, prior utilization of rebates for a particular patient, and/or the like. However, different sub-systems may calculate the amounts in different ways, may have different contractual agreements with different manufacturers, and may have different underlying accounting systems for crediting the pharmacy with funds allocated from manufacturers.

BRIEF SUMMARY

Methods, apparatuses, and computer program products are therefore provided for utilizing accumulation records to reduce a number of transactions occurring in a network. As set forth above, when a service provider computer facilitates the distribution of manufacturer-paid rebates through use of two or more sub-systems, various issues can arise. The service provider computer may employ one or more sub-systems, configured to evaluate a prescription transaction, and calculate at least some component of the drug pricing, such as but not limited to a manufacturer-paid rebate. However, in some instances, a particular manufacturer contracts with more than one sub-system, such as in an effort to reach a greater number of patients and/or pharmacies. In some instances, different sub-systems may be initially developed independently of one another, and optionally operated or maintained by different service provider computers.

However, in some instances, a service provider may acquire or otherwise merge with additional organizations such that the different sub-systems are maintained and operated by the service provider (and by one service provider computer, or service provider system operated by a common service provider). Some manufacturers place caps on the rebate amount applied to a prescription transaction and/or toward a particular patient in a predefined period of time (e.g., per year), but in instances in which a service provider utilizes two or more sub-systems, the cap may be individually enforced within each sub-system, such that the service provider computer enables two or more rebates under the two or more systems, which in total may exceed a cap amount desired to be enforced by the manufacturer.

Still further, each of the different sub-systems may require requests to be formatted in a particular way and/or via a different communication interface, such that the service provider computer may need to initiate multiple transactions associated with respective sub-systems, for an individual prescription transaction to be processed under each sub-system For example, the service provider computer may be configured to invoke a first sub-system to determine a rebate amount in response to an initiation of a prescription claim, such as one transmitted toward a prescription benefit manager (PBM). The first sub-system may therefore be invoked by the service provider computer as it performs processing on prescription claims transmitted by a pharmacy computer that includes a prescription claim the service provider computer forwards toward the PBM or associated payer. The first sub-system may therefore access the data in the prescription to calculate a rebate amount and communicate the amount to the service provider computer.

As another example, a second sub-system may be configured to perform a second evaluation or inquiry in response to receiving a coordination of benefits (COB) claim. In this regard, the second sub-system requires a separate and distinct transaction (such as in addition to a prescription claim being submitted to a patient's insurance). The service provider computer may therefore generate or facilitate generating of the COB claim upon receiving a prescription transaction from a pharmacy computer and route the COB to the second sub-system. The second sub-system may utilize data in the COB claim to determine a rebate amount and return it to the service provider computer.

The above are provide merely as examples, and it will be appreciated that different sub-systems may have different data formatting requirements and/or methods of invocation, such that numerous other implementations of any number of sub-systems may be present.

Additionally or alternatively, the different sub-systems may have different associated accounting methods. For example, one sub-system may result in rebates being totaled and paid to a pharmacy on a daily basis while another sub-system totals rebates for a monthly period and initiates payment from the manufacturer to a pharmacy. Different sub-systems may group and fund the transactions in different ways.

Example embodiments improve upon a service provider computer that interacts with two or more sub-systems, by generating aggregated quantities relating to the two ore more sub-systems, and in certain embodiments, selectively modifying the invocation of at least one of the one or more sub-systems. Example embodiments reduce a preliminary quantity, such as in instances in which at least two sub-systems provide rebate amounts, but the sum thereof would exceed a cap set forth by a manufacturer. In some instances, selectively modifying the invocation may include eliminating a request to the one or more sub-systems, such that the number of network transactions are reduced. Accordingly, the reduction in network transactions reduces the consumption of processing, memory, and network resources of the service provider computer and/or one or more sub-systems that would otherwise be needed to route, process, and reconcile responses for the transaction if it were initiated, such that the performance and efficiency of such computer or systems are improved.

An apparatus is provided, including at least one processor and at least one memory including computer program code, the at least one memory and the computer program code configured to, with the processor, cause the apparatus to at least generate an aggregated quantity from at least a first quantity associated with a product identifier and an entity identifier, from a first sub-system, and a second quantity associated with the product identifier and the entity identifier, from a second sub-system, and insert the aggregated quantity into an accumulation record associated with the product identifier and the entity identifier.

The at least one memory and the computer program code configured to, with the processor, parse a message received from a requesting computer to identify an indication of the entity identifier and the product identifier, and determine a preliminary quantity to be applied to the message. The at least one memory and the computer program code configured to, in an instance the preliminary quantity exceeds a remaining quantity calculated as a cap amount less the aggregated quantity, reduce the preliminary quantity to the aggregated quantity. The at least one memory and the computer program code configured to, with the processor, update the accumulation record to reflect the reduced preliminary quantity.

Determining the preliminary quantity and reducing the preliminary quantity occurs in real-time or near real-time in response to parsing the message received from the requesting computer. The at least one memory and the computer program code is further configured to, with the processor, cause the apparatus to at least cause transmission of a response message comprising the reduced preliminary quantity to the requesting computer.

The at least one memory and the computer program code is further configured to, with the processor, cause the apparatus to at least cause transmission of the reduced preliminary quantity to at least one of the first sub-system or the second sub-system. The aggregated quantity may reflect quantities associated with a predefined time period. The at least one memory and the computer program code is further configured to, with the processor, cause the apparatus to at least, responsive to determining the preliminary quantity, preclude transmission of a message to at least one sub-system.

A method is provided, including, with at least a processor, generating an aggregated quantity from at least a first quantity associated with a product identifier and an entity identifier, from a first sub-system, and a second quantity associated with the product identifier and the entity identifier, from a second sub-system. The method further includes inserting the aggregated quantity into an accumulation record associated with the product identifier and the entity identifier, and parsing a message received from a requesting computer to identify an indication of the entity identifier and the product identifier. The method further includes determining a preliminary quantity to be applied to the message, and in an instance the preliminary quantity exceeds a remaining quantity calculated as a cap amount less the aggregated quantity, reducing the preliminary quantity to the aggregated quantity. The method further includes updating the accumulation record to reflect the reduced preliminary quantity.

The method further includes causing transmission of a response message comprising the reduced preliminary quantity to the requesting computer. The method may further include causing transmission of the reduced preliminary quantity to at least one of the first sub-system or the second sub-system, and responsive to determining the preliminary quantity, precluding transmission of a message to at least one sub-system.

A computer program product is provided, including at least one non-transitory computer-readable storage medium having computer-executable program code instructions stored therein, the computer-executable program code instructions comprising program code instructions to generate an aggregated quantity from at least a first quantity associated with a product identifier and an entity identifier, from a first sub-system, and a second quantity associated with the product identifier and the entity identifier, from a second sub-system. The computer-executable program code instructions further include program code instructions to insert the aggregated quantity into an accumulation record associated with the product identifier and the entity identifier, and parse a message received from a requesting computer to identify an indication of the entity identifier and the product identifier. The computer-executable program code instructions further include program code instructions to determine a preliminary quantity to be applied to the message, and in an instance the preliminary quantity exceeds a remaining quantity calculated as a cap amount less the aggregated quantity, reduce the preliminary quantity to the aggregated quantity.

The computer-executable program code instructions further include program code instructions to update the accumulation record to reflect the reduced preliminary quantity, to cause transmission of a response message comprising the reduced preliminary quantity to the requesting computer, and to cause transmission of the reduced preliminary quantity to at least one of the first sub-system or the second sub-system.

An apparatus is also provided, with means for generating an aggregated quantity from at least a first quantity associated with a product identifier and an entity identifier, from a first sub-system, and a second quantity associated with the product identifier and the entity identifier, from a second sub-system. The apparatus further includes means for inserting the aggregated quantity into an accumulation record associated with the product identifier and the entity identifier, and means for parsing a message received from a requesting computer to identify an indication of the entity identifier and the product identifier. The apparatus further includes means for determining a preliminary quantity to be applied to the message, and in an instance the preliminary quantity exceeds a remaining quantity calculated as a cap amount less the aggregated quantity, reducing the preliminary quantity to the aggregated quantity. The apparatus further includes means for updating the accumulation record to reflect the reduced preliminary quantity.

The apparatus further includes means for causing transmission of a response message comprising the reduced preliminary quantity to the requesting computer. The apparatus further includes means for causing transmission of the reduced preliminary quantity to at least one of the first sub-system or the second sub-system, and responsive to determining the preliminary quantity, means for precluding transmission of a message to at least one sub-system.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
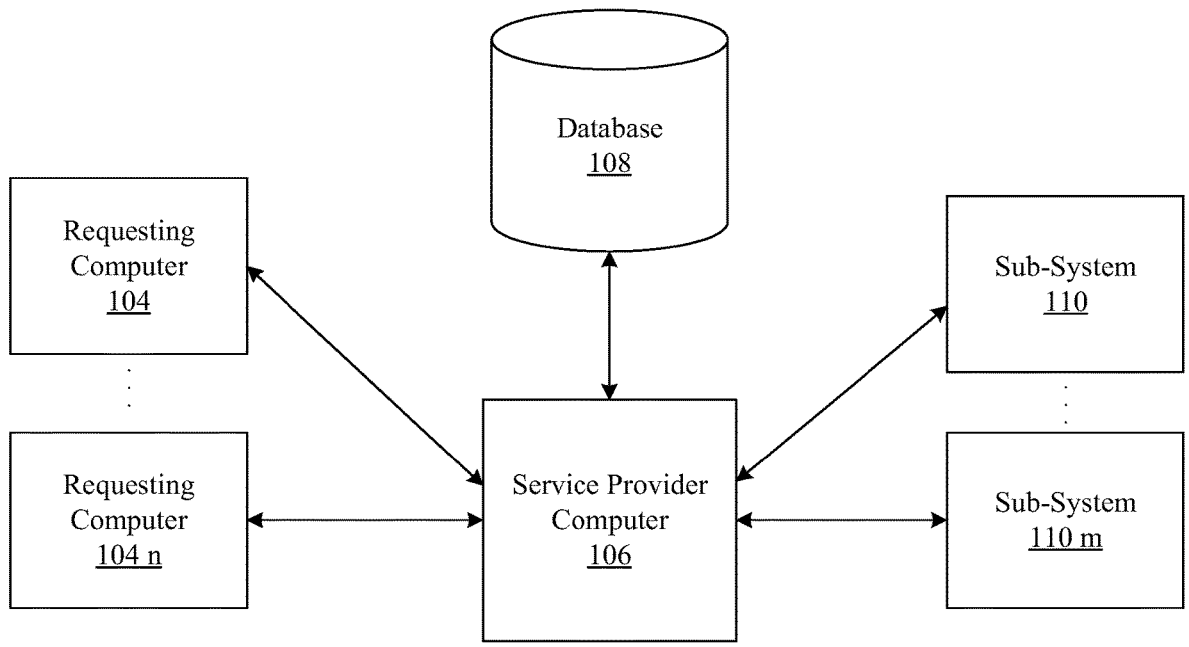
Figure 2:
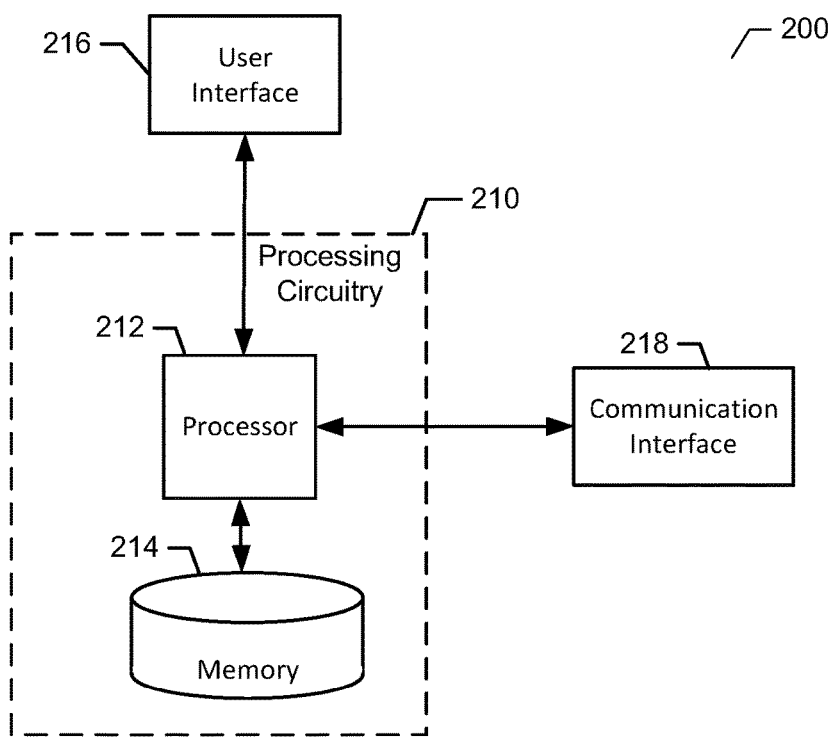
Figure 3:
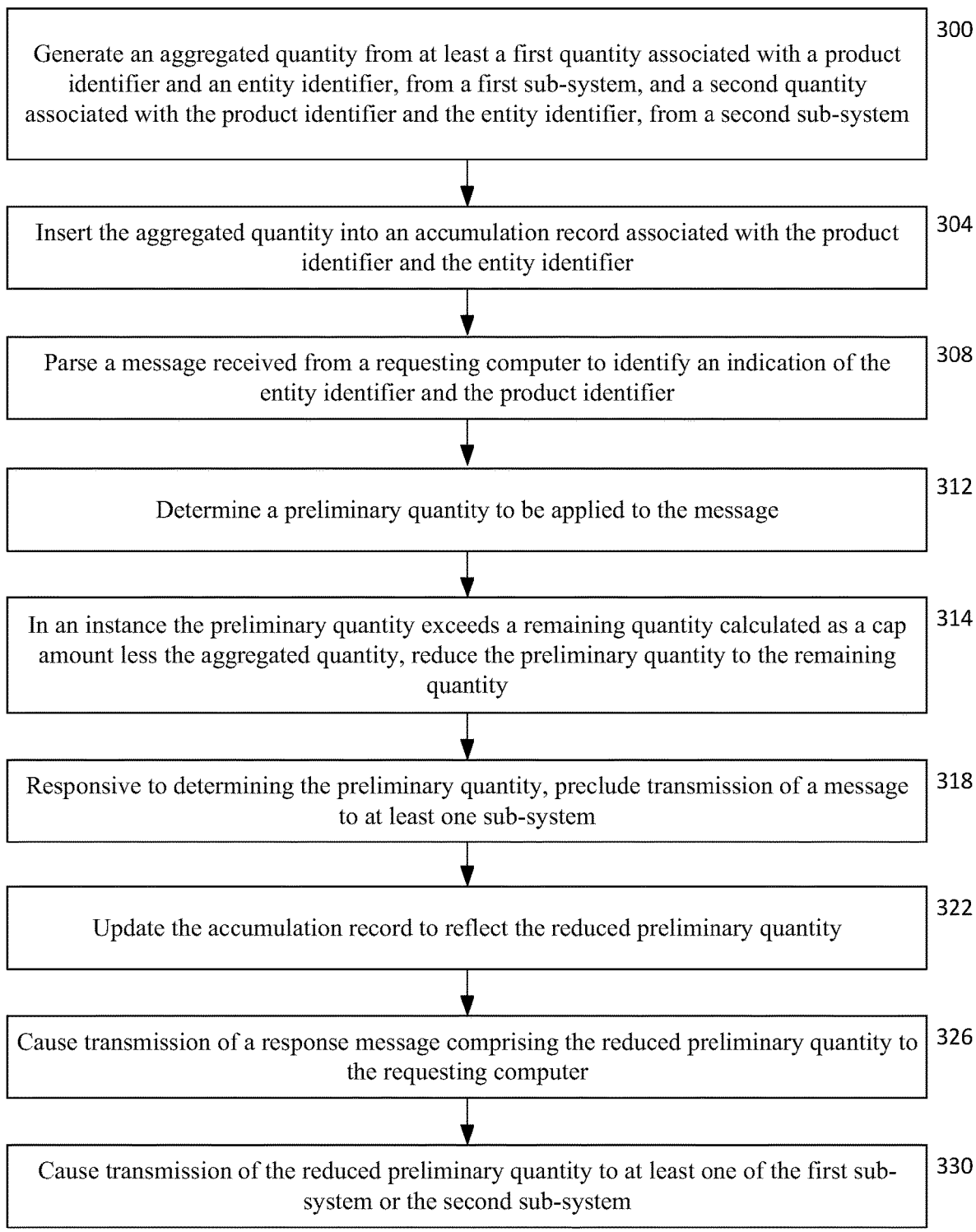

Having thus described embodiments of the invention in general terms, reference will now be made to the accompanying drawings, which are not necessarily drawn to scale, and wherein:

FIG. 1 is an example overview of a system that can be used to practice some example embodiments described herein;

FIG. 2 is an exemplary schematic diagram of an apparatus in accordance with some example embodiments; and FIG. 3 is a flowchart of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that can be used to practice certain example embodiments. The requesting computer 104 may be any processor-driven device that facilitates the submission of messages to the service provider computer 106. Any number of requesting computers 104, such as requesting computers 104-104n (any of which may be referred to as requesting computer 104) may be present in a network to transmit messages to the service provider computer 106.

In certain embodiments, a requesting computer 104 may be associated with a pharmacy or pharmacy network to facilitate the filling of prescriptions, transmitting prescription claims to a service provider computer 106, and/or the like. The requesting computer 104 may additionally or alternatively be associated with a physician's office, clinic, long-term care facility, hospital, etc. Accordingly, while the exemplary requesting computer 104 may be frequently referenced herein as part of a pharmacy or pharmacy network, the requesting computer 104 may be associated with any other healthcare provider, such as a physician's office, hospital and/or other medical facility. Further, it will be appreciated that the requesting computer 104 may be implemented as a pharmacy computer, and that references herein to a "requesting computer" may be interchanged with references to a "pharmacy computer."

The requesting computer 104 may therefore facilitate the submission of messages, such as prescription transactions, or prescription transactions requests, made by patients or consumers, and the communication of information associated with such messages (e.g., prescription transactions) to the service provider computer 106. In certain example embodiments, the requesting computer 104 may be a point of sale device associated with a pharmacy. The execution of the computer-implemented instructions by the requesting computer 104 may form a special purpose computer or other particular machine that is operable to facilitate the submission of pharmacy transaction requests made by patients, pharmacists, and/or the like, and the communication of information associated therewith to a service provider computer 106.

The service provider computer 106 may include, but is not limited to, a processor-driven device that is configured for receiving, processing, and responding to messages (e.g., prescription transactions) from the requesting computer 104. The service provider computer 106 may process such messages by invoking numerous sub-systems 110-110m (any of which may be referred to as sub-system 110), described in further detail below. In certain embodiments, the service provider computer 106 may receive responses from sub-systems 110, and further process and/or return the response to a requesting computer 104 from which an associated transaction originated. Accordingly, the service provider computer 106 may be operable to facilitate the receipt, routing, and/or further processing of healthcare transactions such as prescription transactions, prescription claims, and/or associated responses amongst various components and/or sub-systems such as, but not limited to, those depicted in FIG. 1.

In certain exemplary embodiments, the service provider computer 106 may be configured as or may comprise a switch or router that evaluates, modifies, reformats, generates, and/or routes transactions such as healthcare transactions and prescription transactions. For example, the service provider computer 106 may route transactions communicated from the requesting computer 104 to a sub-system 110 configured to evaluate the transaction and return information regarding the transactions. In certain embodiments, the service provider computer 106 may reformat transactions into another form of transaction and modify the recipient information of the reformatted transaction before routing the reformatted transaction to another party, such as sub-system 110. The service provider computer 106 may also optionally apply edits to at least some of the messages and/or transactions, and/or construct a separate message response for messages received via the switch.

A sub-system 110 may be any system or sub-system with which the service provider computer 106 interacts. For example, a sub-system 110 may be an evaluation system configured to evaluate a transaction and return a response pertaining to the details of the transaction. According to certain embodiments, a sub-system 110 may determine a quantify (e.g., manufacturer-paid rebate amount) based on the details of a prescription transaction. Different sub-systems may utilize different algorithms, certain variables and/or weights thereof such that the calculated quantity (e.g., rebate amount) about may be different amongst different sub-systems even for the same transaction. A manufacturer may have different agreements with different sub-systems such that the differences further result in different rebate amounts being calculated. It will be appreciated that some sub-systems may be implemented on the same computer as service provider computer 106, and/or within a distribution system in which the service provider computer 106 is implemented. Additionally or alternatively, a service provider computer 106 may communicate with a sub-system via one or more communication interfaces.

The database 108 may comprise any computing device configured to store aggregated quantities that are generated and maintained by the service provider computer 106 based on quantities associated with different sub-systems 110. The aggregated quantities may indicate total amounts credited toward a particular patient and/or for a particular prescription drug, and may be updated daily and/or on another basis according to information received from one or more sub-systems 100. The database 108 may further store cap amounts to be enforced on behalf of a manufacturer, which may define the maximum rebate amount allowed for a patient toward the costs of a particular drug and in a given time period, such as a year.

The database 108 may be maintained or operated by the service provider computer 106, as it functions as a switch for routing and processing certain transactions submitted by various requesting computers 104, and responses from sub-systems 110. The service provider computer 106 may access the database 108 to determine an aggregated quantity for a particular prescription drug and/or patient, and may do so in real-time or near real-time relative to receiving an electronic message indicative of a prescription transaction from a requesting computer, such as a pharmacy computer.

As used herein, the terms real-time and near real-time indicate a seemingly instant response time. However, it will be appreciated that despite the reference to real-time or near real-time, certain delays based on computer processing time may be encountered.

Referring now to FIG. 2, apparatus 200 is a computing device(s) configured for implementing requesting computer 104, service provider computer 106, database 108, and/or sub-system 110, according to example embodiments.

Apparatus 200 may at least partially or wholly embody or be embodied by any of the requesting computer 104, service provider computer 106, database 108, and/or sub-system 108. Apparatus 200 may therefore implement any of the requesting computer 104, service provider computer 106, and/or sub-system 110, in accordance with some example embodiments, or may be implemented as a distributed system that includes any of the requesting computer 104, service provider computer 106, database 108, sub-system 110, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional in any of the requesting computer 104 (such as when the requesting computer 104 is implemented as a service communicatively connected to a work station or other user device utilized by a pharmacist or other pharmacy employee), service provider computer 106, and/or sub-system 110. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the requesting computer 104, service provider computer 106, database 108, sub-systems 110, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as requesting computer 104, service provider computer 106, database 108, sub-system 110, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as service provider computer 106, memory 214 may be configured to store computer program code for performing corresponding functions thereof, as described herein according to example embodiments.

Still further, memory 214 may be configured to store routing tables, that facilitate determining the destination of communications received from a requesting computer 104, and/or sub-system 110. Memory 214 may further include reconciliation tables for tracking the healthcare transactions received from the requesting computer 104, and reconciling them with responses received from sub-system 110. The memory 214 may further comprise a database, such as database 108, comprising aggregated quantities of rebate amounts associated with various sub-systems. Still further, according to certain embodiments, the memory 214 may be modified as described herein, to reformat prescription claims and/or prescription transactions with additional information, such as an indication of an aggregated quantity, or other information, generated according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases that may store a variety of files, content, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 is implemented as the requesting computer 104, the user interface 216 may, in some example embodiments, provide means for user entry of details relating to the dispensing of a prescription, and/or the like. The user interface 216 may be further configured to display or provide patient pay amounts of prescription medications, such as when apparatus 200 is implemented as a requesting computer 104. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of requesting computer 104, service provider computer 106, database 108, sub-systems 110 and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods. As described herein according to example embodiments, the processor 212 may be configured to preclude transmission of transactions that may have otherwise been transmitted over the communication interface to one or more sub-systems 110.

A network, such as the network in which any of the systems of FIG. 1 or components thereof or components described herein may operate, (e.g., requesting computer 104, service provider computer 106, database 108, sub-system 110, apparatus 200, and/or the like) may include a local area network, the Internet, any other form of a network, or any combination thereof, including proprietary private and semi-private networks and public networks. The network may comprise a wired network and/or a wireless network (e.g., a cellular network, wireless local area network, wireless wide area network, some combination thereof, and/or the like).

FIG. 3 is a flowchart illustrating example operations of an apparatus 200, according to some example embodiments. The operations of FIG. 3 may be performed by apparatus 200, such as with the service provider computer 106, and/or the like.

As shown by operation 300, apparatus 200 may include means, such as processor 212, memory 214, communication interface 218, and/or the like, for generating an aggregated quantity from at least a first quantity associated with a product identifier and an entity identifier, from a first sub-system, and a second quantity associated with the product identifier and the entity identifier, from a second sub-system. In this regard, various first sub-systems may provide quantities, or amounts of manufacturer-paid rebates applied toward prescription transactions. The product identifier may identify a drug, and may include a national drug code (NDC), generic product identifier (GPI) and/or the like. The entity identifier may include any patient identifier unique identifying a patient. Quantities, such as rebates, associated with different sub-systems that are credited in a prescription transaction are received by the service provider computer 106, for example, with respect to operation 322 described below. Additionally or alternatively, a sub-system 110 may provide notification to a service provider computer 106 of the amount credited with respect to a prescription transaction, such as on a daily basis. The service provider computer 106 may generate the aggregated quantity by adding amounts or quantities from different sub-systems, including any aggregated quantities present in the database 108 for the particular patient and/or prescription drug.

As shown by operation 304, apparatus 200 may include means, such as processor 212, memory 214, communication interface 218, and/or the like, for inserting the aggregated quantity into an accumulation record associated with the product identifier and the entity identifier. If an accumulation record does not yet exist for the patient and/or patient-prescription drug pair, the accumulation record may be created in database 108 such that the aggregated quantity is inserted (or updated) accordingly.

The aggregated quantities may be tracked on a per-patient basis, and/or per-patient per-medication basis, and may optionally be reset to cover only a specified time period, such as a calendar year. Any variation of grouping and/or resetting of aggregate quantities may be contemplated. Operations 300 and 304 may be performed on an ongoing basis such that the service provider computer 106 maintained the aggregated quantities in accumulation records in database 108.

As shown by operation 308, apparatus 200 may include means, such as processor 212, memory 214, communication interface 218, and/or the like, for parsing a message received from a requesting computer to identify an indication of the entity identifier and the product identifier. Example embodiments may receive, from a requesting computer 104 and via communication interface 218, a message such as a prescription transaction, comprising the entity identifier (e.g., patient identifier) and product identifier (e.g., prescription drug identifier), among other data. The message (e.g., prescription transaction) may be received from the requesting computer 104, such as following entry by a pharmacist, or other user, of data relating to a prescription drug being obtained by a patient. In this regard, the message (e.g., prescription transaction) may include a prescription claim entered by the pharmacist. The message (e.g., prescription transaction) may be received at the service provider computer 106 for further processing as described below.

As shown by operation 312, apparatus 200 may include means, such as processor 212, memory 214, communication interface 218, and/or the like, for determining a preliminary quantity to be applied to the message. The preliminary quantity may be determined in a variety of ways, and may include invoking, and/or transmitting requests to one or more sub-systems, although it will be appreciated that in some scenarios, the service provider computer 106 may preclude transmitting requests and/or transactions to certain sub-systems, as described in further detail below.

In certain embodiments, the service provider computer 106 may determine how many sub-systems, if any, may be applied to the transaction. Accordingly, the service provider computer 106 may determine whether a manufacturer of the prescription drug being obtained by the patient is subject to manufacturer rebates, and if so, under which sub-systems. If more than one sub-system can be invoked for a specific transaction, the service provider computer 106 may invoke the sub-systems in a variety of ways, such as sequentially, and/or independently of one another. If configured for sequentially invoking multiple sub-systems, the service provider computer 106 may selectively invoke or preclude invocation of certain sub-systems based on a response of another. The sequential invocation and/or optional preclusion of certain sub-systems is described in further detail herein, such as with respect to operation 318.

As described herein, the service provider computer 106 invokes certain sub-systems in real-time or near real-time relative to having received the message indicative of a prescription transaction. The invocation of a sub-system may include invoking an algorithm to determine a credit amount, such as based on details from a prescription benefit claims. Invocation of another sub-system may require other operations, such as generating a COB claim.

It will be appreciated that determining a preliminary quantity to be applied to the message may include performing additional pricing algorithms, transactions and/or requests. For example, the service provider computer 106 may transmit a request to a PBM or associated payer, to determine a co-pay or patient pay amount for the prescription drug, possibly before any manufacturer-paid rebates are applied. The rebate and/or credit amount, such as the preliminary quantity, may be calculated dependent on the patient pay amount with an insurance benefit applied. For example, prescriptions with higher patient pay amounts may receive a greater manufacturer-paid rebate than those with lower patient pay amounts so patients are encouraged to adhere to their prescriptions. Various algorithms and/or factors may be utilized by different sub-systems. Additionally or alternatively, and as described above, different sub-systems may require the data be in different formats to engage a respective sub-system. For example, a first sub-system may utilize a prescription claim formatted for a PBM and/or other payer, such as one formatted in the NCPDP standard. As another example, another sub-system may require generation of a COB claim.

In some scenarios, multiple sub-systems may be invoked, and the sum of the respective quantities determined as the preliminary quantity to apply to the message and/or prescription transaction. Additionally or alternatively, determining a preliminary quantity to be applied to the message (or modifying the preliminary quantity), as set forth by operation 312 may further include or result in operations 314 and/or 318 described below.

As shown by operation 314, apparatus 200 may include means, such as processor 212, memory 214, communication interface 218, and/or the like, for in an instance the preliminary quantity exceeds a remaining quantity calculated as a cap amount less the aggregated quantity, reducing the preliminary quantity to the aggregated quantity. In this regard, a rebate amount initially calculated according to one or more sub-systems could result in an amount for a patient and drug exceeding the cap set by the manufacturer, and should be reduced so the cap is not exceeded.

Additionally or alternatively, as shown by operation 318, responsive to determining the preliminary quantity, apparatus 200 may include means, such as processor 212, memory 214, communication interface 218, and/or the like, for precluding transmission of a message to at least one sub-system.

In this regard, the service provider computer 106 may access the aggregated quantity in database 108 for a particular patient and/or patient-prescription combination. A remaining quantity, or remaining quantity allowed as manufacturer-rebate credits may be calculated as the cap amount minus the aggregated quantity.

If an amount returned from a first-invoked sub-system, and/or a sum of credits based on several first-invoked sub-systems, indicates an amount equal to and/or greater than a remaining quantity allowed, example embodiments reduce the preliminary quantity to the aggregated quantity aggregated quantity. In such scenarios, if the service provider computer is configured for sequential invocation of the sub-systems 106, a subsequent sub-system may not be invoked and example embodiments preclude transmission of the message to the at least one sub-system. If the preliminary quantity is greater than the remaining quantity allowed, the preliminary quantity is reduced to match the remaining quantity.

As shown by operation 322, apparatus 200 may include means, such as processor 212, memory 214, communication interface 218, and/or the like, for updating the accumulation record to reflect the reduced preliminary quantity. In this regard, if an accumulation record exists for the patient and/or patient-drug combination, the accumulation quantity is updated to further include the amount credited toward the prescription transaction. If the accumulation record does not yet exist for a patient-drug combination, an accumulation record may be inserted into the database 108 reflecting the amount credited as the accumulation quantity. It will be appreciated that in certain embodiments, operation 322 occurs in real-time or near real-time relative to the operations 308, 312, 31, 318, and/or the like. However, in certain embodiments, the update to, or insertion of the accumulation record in database 108 may occur at another time, such as on a routine basis (e.g., daily), and optionally as directed by the respective sub-system 110.

As shown by operation 326, apparatus 200 may include means, such as processor 212, memory 214, communication interface 218, and/or the like, for causing transmission of a response message comprising the reduced preliminary quantity to the requesting computer. The service provider computer 106 utilizes responses received from a PBM and/or associated adjudication system/computer, as well as the calculation of the reduced preliminary quantity to determine a further reduced out of pocket cost for the patient for a prescription drug, and provides it to the requesting computer 104, such as a pharmacy computer in real-time or near real-time as the transaction is initiated at the pharmacy computer. The requesting computer 104 may then display the adjusted out of pocket cost that reflects the reduced preliminary quantity credited toward the transaction. The patient may then purchase the prescription with the rebate applied.

As shown by operation 330, apparatus 200 may include means, such as processor 212, memory 214, communication interface 218, and/or the like, for causing transmission of the reduced preliminary quantity, or quantities, to at least one of the first sub-system or the second sub-system. In this regard, amounts calculated by the service provider computer 106 to be paid as manufacturer-paid credits are communicated to the respective sub-system. The amounts may be stored such that a subsequent accounting reconciliation processes can further calculate total amounts to be funded from a manufacturer to a pharmacy. It will be appreciated that causing transmission of the reduced preliminary quantity may include updating a database, such as database 108, as directed by at least the service provider computer 106 to reflect the amount of the credit. Following the transmission of the reduced preliminary quantity to the respective sub-system, the sub-system may then perform, or provide the data to an entity that performs any accounting reconciliation procedures, such as those than initiate electronic funding of manufacturer-paid rebates toward the pharmacy. In many scenarios, such as those in which transmission of a message to a second sub-system is precluded, transactions relating to the accounting-related reconciliation for the sub-system may further be reduced, as fewer instances of credits are being applied under the sub-system.

Example embodiments provided herein therefore provide a technical improvement in networked-based service provider computers interfacing with multiple sub-systems. In many alternative, routine, and/or conventional implementations, such systems utilize all sub-systems eligible for a transactions, often resulting in multiple transactions with the sub-systems, and multiple rebates applied under the respective sub-systems, and therefore multiple rebates that need to be funded and reconciled. However, according to example embodiments provided herein, the service provider computer 106 reduces many unnecessary transactions and can therefore reduce the number of sub-systems with which the service provider computer 106 interacts, thereby conserving processing, memory, and network resources otherwise consumed to facilitate the processing of, storage of, and routing of related messages amongst network components.

Moreover, the improved service provider computer 106 provided according to example embodiments, enforces the cap amounts desired for manufacturer, for certain drugs and a given patient over a period of time, that could otherwise be exceeded by a service provider computer that uses multiple sub-systems according to routine and conventional methods and without the advantages of the disclosed embodiments. By creating the aggregated quantities and accumulation records, the service provider computer 106 enforces the cap amounts, and reduces unnecessary transactions.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIG. 3 illustrates operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
   in response to at least one of: (a) initiation of a routine process to aggregate rebate amounts applied for a patient having an associated patient identifier, for a prescription drug associated with a prescription drug identifier, and a manufacturer that manufactures the prescription drug, or (b) receiving a message indicating a prescription transaction associated with the patient identifier, the prescription drug identifier, and the manufacturer, access a first sub-system and a second sub-system that are integrated with the apparatus but operate independently of each other to provide the apparatus manufacturer rebate amounts;
   retrieve, from the first sub-system, first rebate amounts associated with one or more prescription transactions having occurred within a predefined time period, the patient identifier, the prescription drug identifier, and the manufacturer;
   retrieve, from the second sub-system, second rebate amounts associated with the one or more prescription transactions or additional prescription transactions having occurred within a predefined time period, the patient identifier, the prescription drug identifier, and the manufacturer;
   generate an aggregated rebate amount by summing the first rebate amounts and the second rebate amounts, the aggregated rebate amount representing a sum of rebates credited for the patient identifier, the prescription drug identifier, and the manufacturer during the predefined time period;
   insert the aggregated rebate amount into an accumulation record associated with the prescription drug identifier, the patient identifier, and the manufacturer;
   receive, from a pharmacy computer, a prescription transaction comprising the patient identifier and the prescription drug identifier;
   in response to receiving the prescription transaction:
      access the accumulation record to obtain the aggregated rebate amount;
      route the prescription transaction to one of the first sub-system or the second sub-system to retrieve a preliminary rebate amount for the prescription transaction;
      retrieve a cap amount set by the manufacturer representing a maximum amount to be paid per patient and per prescription drug during the predefined time period;
      calculate a remaining rebate amount as the cap amount less the aggregated rebate amount;
      determine the preliminary rebate amount exceeds the remaining rebate amount, and in response thereto, reduce the preliminary rebate amount to the aggregated rebate amount;
      in response to determining the preliminary rebate amount exceeds the remaining rebate amount, preclude transmission of the prescription transaction to the other at least one of the first sub-system or the second sub-system to prevent the prescription transaction from resulting in exceeding the cap amount set by the manufacturer; and
      update the accumulation record to reflect the reduced preliminary rebate amount.

2. The apparatus according to claim 1, wherein determining the preliminary rebate amount and reducing the preliminary rebate amount occurs in real-time or near real-time in response to receiving the prescription transaction from the pharmacy computer.

3. The apparatus according to claim 1, wherein the at least one memory and the computer program code is further configured to, with the processor, cause the apparatus to at least:
   cause transmission of a response message comprising the reduced preliminary rebate amount to the pharmacy computer.

4. The apparatus according to claim 1, wherein the at least one memory and the computer program code is further configured to, with the processor, cause the apparatus to at least:
   cause transmission of the reduced preliminary rebate amount to the at least one of the first sub-system or the second sub-system from which the preliminary rebate amount was received.

5. A method comprising:
   in response to at least one of: (a) initiation of a routine process to aggregate rebate amounts applied for a patient having an associated patient identifier, for a prescription drug associated with a prescription drug identifier, and a manufacturer that manufactures the prescription drug, or (b) receiving a message indicating a prescription transaction associated with the patient identifier, the prescription drug identifier, and the manufacturer, accessing, by a service provider computer, a first sub-system and a second sub-system that are integrated with a service provider computer but operate independently of each other to provide the service provider computer manufacturer rebate amounts;

retrieving, from the first sub-system, first rebate amounts associated with one or more prescription transactions having occurred within a predefined time period, the a patient identifier, a prescription drug identifier, and the manufacturer;

retrieving, from the second sub-system, second rebate amounts associated with the one or more prescription transactions or additional prescription transactions having occurred within a predefined time period, the patient identifier, the prescription drug identifier, and the manufacturer;

with at least a processor, generating an aggregated rebate amount by summing the first rebate amounts and the second rebate amounts, the aggregated rebate amount representing a sum of rebates credited for the patient identifier, the prescription drug identifier, and the manufacturer during the predefined time period;

inserting the aggregated rebate amount into an accumulation record associated with the prescription drug identifier, the patient identifier and the manufacturer;

receiving, from a pharmacy computer, a prescription transaction comprising the patient identifier and the prescription drug identifier;

in response to receiving the prescription transaction:
  accessing the accumulation record to obtain the aggregated rebate amount;
  routing the prescription transaction to one of the first sub-system or the second sub-system to determine a preliminary rebate amount for the prescription transaction;
  retrieving a cap amount set by the manufacturer representing a maximum amount to be paid per patient and per prescription drug during the predefined time period;
  calculating a remaining rebate amount as the cap amount less the aggregated rebate amount;
  determining the preliminary rebate amount exceeds the remaining rebate amount, reducing the preliminary rebate amount to the aggregated rebate amount;
  in response to determining the preliminary rebate amount exceeds the remaining rebate amount, preclude transmission of a message to the other at least one of the first sub-system or the second sub-system to prevent the prescription transaction from resulting in exceeding the cap amount set by the manufacturer; and
  update the accumulation record to reflect the reduced preliminary rebate amount.

6. The method according to claim 5, wherein determining the preliminary rebate amount and reducing the preliminary rebate amount occurs in real-time or near real-time in response to receiving the prescription transaction from the pharmacy computer.

7. The method according to claim 5, further comprising:
causing transmission of a response message comprising the reduced preliminary rebate amount to the pharmacy computer.

8. The method according to claim 5, further comprising:
causing transmission of the reduced preliminary rebate amount to the at least one of the first sub-system or the second sub-system from which the preliminary rebate amount was received.

9. A computer program product comprising at least one non-transitory computer-readable storage medium having computer-executable program code instructions stored therein, the computer-executable program code instructions comprising program code instructions to:

in response to at least one of: (a) initiation of a routine process to aggregate rebate amounts applied for a patient having an associated patient identifier, for a prescription drug associated with a prescription drug identifier, and a manufacturer that manufactures the prescription drug, or (b) receiving a message indicating a prescription transaction associated with the patient identifier, the prescription drug identifier, and the manufacturer, access a first sub-system and a second sub-system that are integrated with the apparatus but operate independently of each other to provide the apparatus manufacturer rebate amounts;

retrieve, from the first sub-system, first rebate amounts associated with one or more prescription transactions having occurred within a predefined time period, the patient identifier, the prescription drug identifier, and the manufacturer;

retrieve, from the second sub-system, second rebate amounts associated with the one or more prescription transactions or additional prescription transactions having occurred within a predefined time period, the patient identifier, the prescription drug identifier, and the manufacturer;

generate an aggregated rebate amount by summing the first rebate amounts and the second rebate amounts, the aggregated rebate amount representing a sum of rebates credited for the patient identifier, the prescription drug identifier, and the manufacturer during the predefined time period;

insert the aggregated rebate amount into an accumulation record associated with the prescription drug identifier, the patient identifier, and the manufacturer;

receive, from a pharmacy computer, a prescription transaction comprising the patient identifier and the prescription drug identifier;

in response to receiving the prescription transaction:
  access the accumulation record to obtain the aggregated rebate amount;
  route the prescription transaction to one of the first sub-system or the second sub-system to retrieve a preliminary rebate amount for the prescription transaction;
  retrieve a cap amount set by the manufacturer representing a maximum amount to be paid per patient and per prescription drug during the predefined time period;
  calculate a remaining rebate amount as the cap amount less the aggregated rebate amount;
  determine the preliminary rebate amount exceeds the remaining rebate amount, and in response thereto, reduce the preliminary rebate amount to the aggregated rebate amount;
  in response to determining the preliminary rebate amount exceeds the remaining rebate amount, preclude transmission of the prescription transaction to the other at least one of the first sub-system or the second sub-system to prevent the prescription transaction from resulting in exceeding the cap amount set by the manufacturer; and
  update the accumulation record to reflect the reduced preliminary rebate amount.

10. The computer program product according to claim 9, wherein determining the preliminary rebate amount and reducing the preliminary rebate amount occurs in real-time or near real-time in response to receiving the prescription transaction from the pharmacy computer.

11. The computer program product according to claim 9, wherein the computer-executable program code instructions comprising program code instructions to:
   cause transmission of a response message comprising the reduced preliminary rebate amount to the pharmacy computer.

12. The computer program product according to claim 9, wherein the computer-executable program code instructions comprising program code instructions to:
   cause transmission of the reduced preliminary rebate amount to the at least one of the first sub-system or the second sub-system from which the preliminary rebate amount was received.

\* \* \* \* \*

UNITED STATES PATENT AND TRADEMARK OFFICE
CERTIFICATE OF CORRECTION

PATENT NO. : 11,966,386 B1
APPLICATION NO. : 17/708432
DATED : April 23, 2024
INVENTOR(S) : Tate Williams et al.

It is certified that error appears in the above-identified patent and that said Letters Patent is hereby corrected as shown below:

In the Claims

In Column 17, Line 6, Claim 5, delete "the a" and insert -- the --, therefor.

Signed and Sealed this
Fifteenth Day of October, 2024

Katherine Kelly Vidal
*Director of the United States Patent and Trademark Office*